July 24, 1962   M. J. BROAD   3,045,686
INERTIA OPERATED FUEL GOVERNORS
Filed Dec. 6, 1960
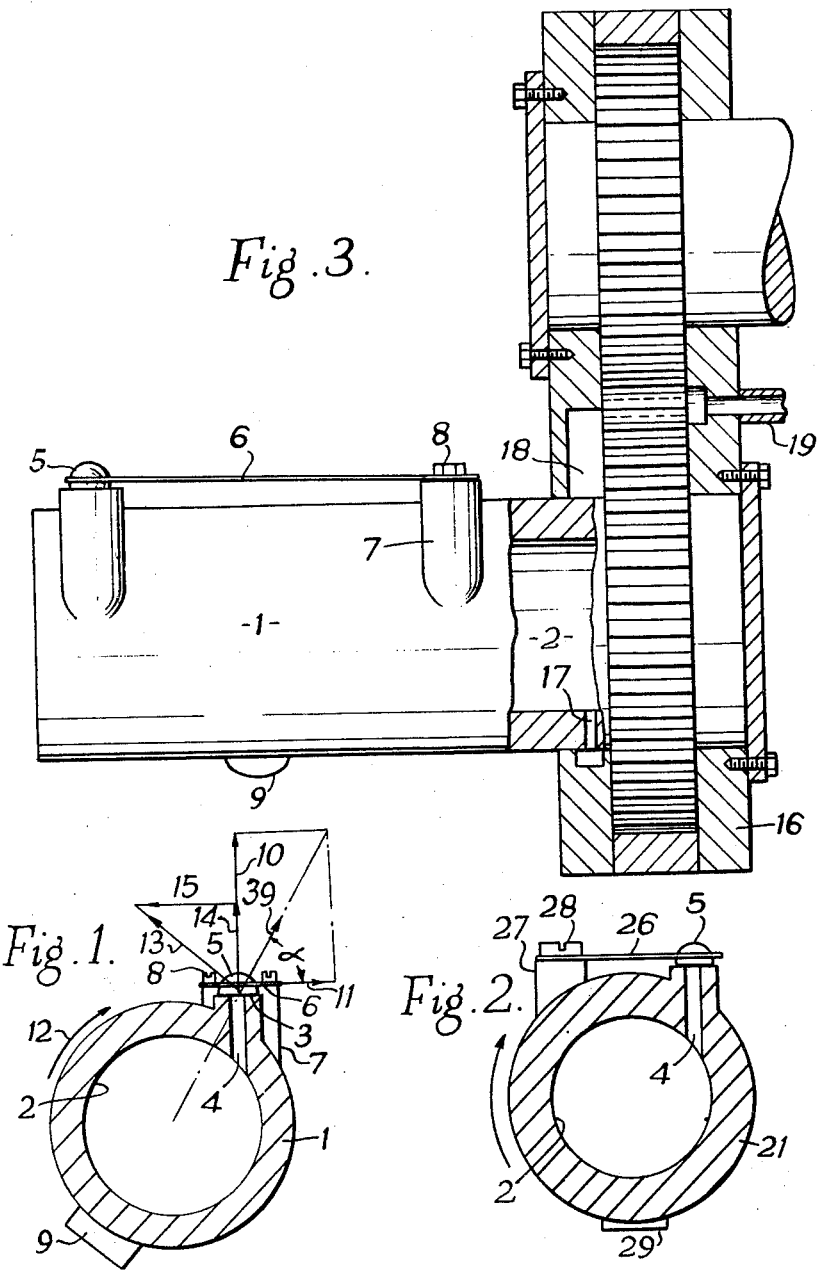
M. J. Broad
Inventor
by: William E. P. Bayly
Attorney

# United States Patent Office 3,045,686
Patented July 24, 1962

3,045,686
INERTIA OPERATED FUEL GOVERNORS
Michael John Broad, Enfield, England, assignor to The Plessey Company Limited, London, England, a British company
Filed Dec. 6, 1960, Ser. No. 75,074
Claims priority, application Great Britain Dec. 21, 1959
3 Claims. (Cl. 137—56)

The present invention relates to fuel governors of the kind in which the flow of fuel to an injection nozzle or similar point of consumption is controlled, within the range of operation of the device of the governor, by means of an inertia-operated spill valve which together with its valve seat rotates with a shaft through which the fuel flow is conducted, and which is opened by inertia action as the speed of the shaft rises.

A convenient form of governor of the kind specified comprises a valve member closing a seat at the end of a radial passage in the shaft, this valve member being carried at one end of a blade spring which extends along, or transversely to, the shaft and is secured to the shaft at its other end. The present invention has for an object to provide an improved governor of the kind specified which will respond by opening, or further opening, the valve and thus reducing the effective fuel flow from the constant displacement fuel pump to the injection nozzle or the like when, within the range of operation of the valve, the acceleration of the shaft reaches a comparatively high value. For this purpose according to the invention the valve, instead of being arranged to move radially of the shaft, is arranged to move at a predetermined angle to such radial direction so that not only the centrifugal force but also tangential inertia forces tend to lift the valve off its seat, the direction of inclination being so chosen that positive acceleration, i.e. acceleration increasing the rate of rotation in the direction of operation of the shaft, tends to open the valve, while on the contrary deceleration tending to decrease the speed of the shaft tends to reduce the opening of the valve.

The invention is illustrated in the drawing accompanying the specification, in which FIGURE 1 is a section, transversely of the governor shaft, of an embodiment in which the valve is mounted on a leaf spring extending longitudinally of the shaft, FIGURE 2 similarly illustrates an embodiment in which the leaf spring extends at right angles to the shaft, and FIGURE 3 of the accompanying drawing is a somewhat diagrammatic side elevation, partly in section, of the embodiment of FIGURE 1, together with a gear-type fuel pump.

Referring now first to FIGURES 1 and 3 a shaft 1, for example one of the shafts of a gear-type fuel pump 16, has a coaxial bore 2 which communicates through a cross-bore 17 and passages 18 with the delivery diameter of the pump 16, from which also issues a passage 19 for the conduction of the delivered fuel to the point of consumption, for example to an injection nozzle not shown. A flat valve seat 3 is formed at the end of a bore 4 leading to the central passage 2, the plane of the valve seat 3 forming in the plane of rotation an angle α with the radius connecting the centre of the seat 3 with the axis of the shaft. A half-ball shaped valve element 5 is urged into engagement with the valve seat 3 by a leaf spring blade 6 which extends longitudinally of the shaft, the ball valve being carried by one end of the blade, while the other end of the blade is secured by screws 8 on an anvil 7 of the shaft. A balancing mass 9 is mounted at a suitable point diametrically opposite to the valve assembly 5, 6, 7, 8. When the shaft rotates at constant speed, a centrifugal force acting in the direction of the arrow 39 will be developed by the mass of the valve element 5 and, as shown by the diagram, a component 10 of this force will tend to lift the ball off its seat, while a lateral component 11 will be taken up by the transverse rigidity of the blade 6. When the shaft rotates in the direction of the arrow 12, acceleration of this rotation will produce an inertia force represented by the arrow 13, and it will be seen that the component 14 of this force will assist the tendency of force 10 to open the valve, while the transverse component of this inertia force 15 will, like that of the centrifugal force, be taken up by the rigidity of the blade 6.

The arrangement illustrated in FIGURE 2 works similarly. The blade 26 extends in this case transversely to the direction of the shaft and is secured by screws 28 on an anvil 27 of the shaft 21, the balancing mass 29 being for obvious reasons arranged in a position somewhat different from that of the mass 9 in FIGURE 1.

What I claim is:

1. A fuel governor of the kind comprising a unidirectionally rotatable governor shaft having an axial bore communicating with a volumetric fuel supply and a valve seat communicating with said bore, and a spring-loaded spill valve element co-operating with said valve seat and rotating with said shaft so as to be opened by inertia as the speed of the shaft rises wherein the direction of opening movement of said spill valve element is inclined at a predetermined angle to the radial direction of the governor shaft so that not only the centrifugal force but also tangential inertia forces tend to lift the valve off its seat, said direction of inclination being so chosen that positive acceleration, i.e. acceleration increasing the rate of rotation of the shaft, tends to open the valve, while on the contrary deceleration, tending to decrease the speed of the shaft tends to reduce the opening of the valve.

2. A fuel governor for co-operation with a positive-displacement type fuel pump, comprising a hollow governor shaft, having a central cavity, a valve seat at the outer surface of the shaft, and a passage leading from said cavity to the valve seat, a valve element for co-operation with said seat, a blade spring extending from said valve element, one end of said blade spring being attached to the valve element and its other end being attached to the shaft, so as to support and guide the valve element for movement towards and away from the valve seat in a direction having a component which is radial and a component which is tangential to the radius connecting the centre of gravity of the valve element with the axis of rotation of the shaft.

3. A fuel governor of the kind comprising a governor shaft having an axial bore communicating with a volumetric source of fuel supply, a valve seat on said governor shaft, communicating with said bore, and a spring loaded spill valve element co-operating with said valve seat, wherein the valve element is inclined at an angle to the radial direction of the governor shaft so that tangential inertia forces tend to lift the valve off its seat, the direction being so chosen that positive acceleration, i.e. acceleration increasing the rate of rotation in the direction of operation of the shaft, tends to open the valve, while on the contrary deceleration tending to decrease the speed of the shaft tends to reduce the opening of the valve.

References Cited in the file of this patent
UNITED STATES PATENTS

| | | |
|---|---|---|
| 2,645,237 | Wheeler | July 14, 1953 |
| 2,672,335 | Keller | Mar. 16, 1954 |
| 2,698,021 | Bricker | Dec. 28, 1954 |
| 2,911,987 | Wayman | Nov. 10, 1959 |

FOREIGN PATENTS

| | | |
|---|---|---|
| 1,061,624 | Germany | July 16, 1959 |